C. J. SCOTT.
RUNNING GEAR FOR VEHICLES.
APPLICATION FILED AUG. 2, 1915.
1,190,473.
Patented July 11, 1916.
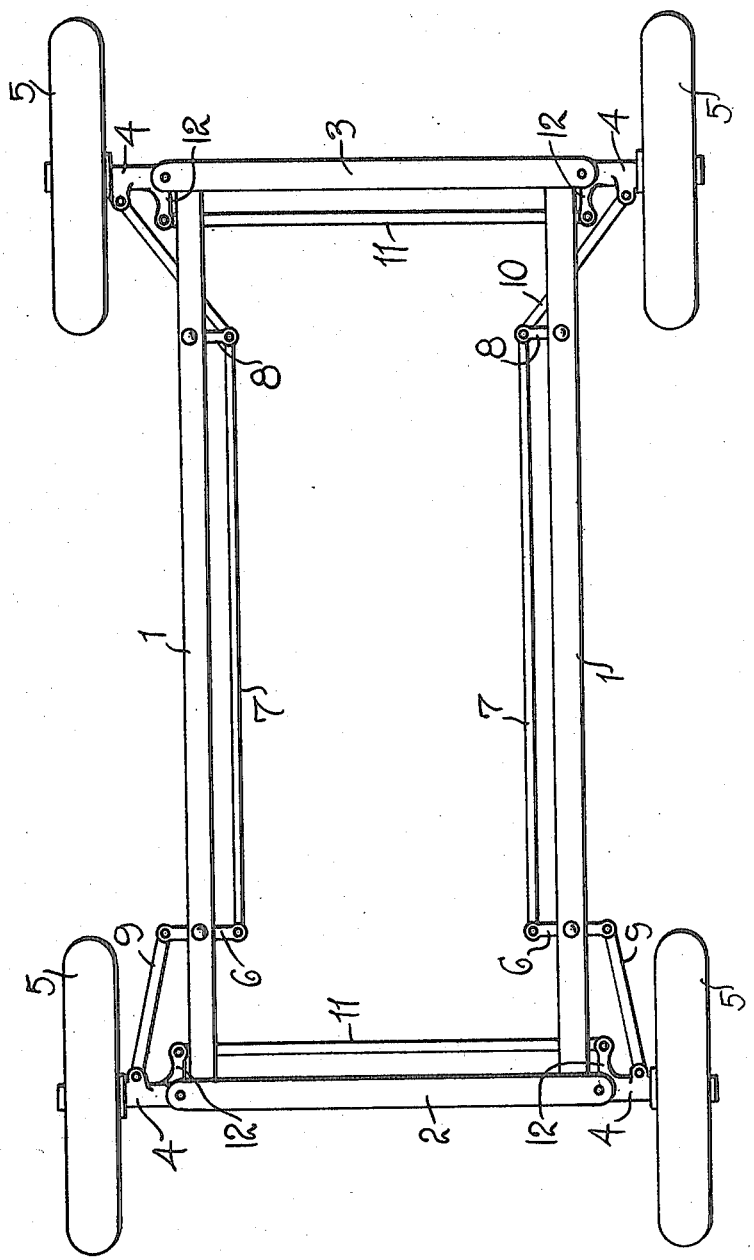
Inventor
C. J. Scott
By Watson E. Coleman
Attorney

UNITED STATES PATENT OFFICE.

CALVIN J. SCOTT, OF HARTSVILLE, SOUTH CAROLINA.

RUNNING-GEAR FOR VEHICLES.

1,190,473.

Specification of Letters Patent.

Patented July 11, 1916.

Application filed August 2, 1915. Serial No. 43,225.

*To all whom it may concern:*

Be it known that I, CALVIN J. SCOTT, a citizen of the United States, residing at Hartsville, in the county of Darlington and State of South Carolina, have invented certain new and useful Improvements in Running-Gears for Vehicles, of which the following is a specification, reference being had to the accompanying drawings.

This invention relates to certain improvements in running gears for vehicles, and it is an object of the invention to provide a device of this general character whereby the rear wheels of the vehicle are caused to track the front wheels during a turn and thus serving to reduce to a minimum the possibility of skidding and affording an easier pull in mud or sand during a turn.

The invention consists in the details of construction and in the combination and arrangement of the several parts of my improved running gears for vehicles whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawing, wherein is illustrated a view in top plan of an embodiment of my invention.

As disclosed in the accompanying drawings, 1 denotes the chassis of an automobile and 2 and 3 the front and rear axles, respectively, and with which the spindles 4 are pivotally engaged. Coacting with the spindles 4 are the supporting wheels 5. Adjacent the forward end of the chassis and at opposite sides thereof are the levers 6 disposed substantially transversely of the chassis and pivotally supported for rocking movement at their longitudinal centers, the inner extremities of said levers being operatively engaged with the rods 7 disposed longitudinally and rearwardly of the chassis 1 and operatively engaged with the inwardly disposed rock arms 8 carried by the chassis adjacent the rear axle 3. The outer extremities of the levers 6 are operatively engaged with the forward spindles 4 through the medium of the rods 9, while the rear rock arms 8 are operatively engaged with the rear spindles 4 through the medium of the rods 10. By this arrangement, it will be seen that upon steering movement being imparted to the forward spindles 4, movement will be imparted to the rear spindles but in an opposite direction whereby the rear wheels 5 will track the forward wheels 5 and thus reduce to a minimum the possibility of skidding and to afford an easier pull during a turn should the vehicle be traveling through mud or sand. The chassis 1 adjacent the axles 2 and 3 and inwardly thereof are provided with the transversely disposed endwise movable rods 11, the extremities of which being operatively engaged with the adjacent spindles 4 through the medium of the arms 12 whereby it will be perceived that the adjacent spindles 4 will be caused to move or swing in unison and in the same general direction.

From the foregoing description, it is thought to be obvious that running gears for vehicles constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with the chassis of a vehicle, spindles operatively supported thereby adjacent the opposite ends thereof and adapted for swinging movement in a horizontal plane, transversely disposed levers pivotally supported at their longitudinal centers at opposite sides of the chassis and adjacent the forward spindles, inwardly disposed rock arms operatively supported by the chassis adjacent the rear spindles, said arms being of a length equal to the length of the inwardly disposed portions of the levers and arranged in parallelism therewith, an operative connection between the inner extremities of the levers and the rock arms, an operative connection between the inner ends of the rock arms and the rear spindles at points outwardly of the pivotal connection between said spindles and the chassis, an operative connection between the outer extremities of the levers and the forward spindles at points outwardly of the pivotal connection between said spindles and the chassis, endwise movable rods disposed transversely of the chassis adjacent the opposite ends thereof, and an operative connection between the extremities of said last named rods and the adjacent spindles whereby the spindles at the same end of the chassis will be caused to move in unison and in the same general direction.

In testimony whereof I hereunto affix my signature in the presence of two witnesses.

CALVIN J. SCOTT.

Witnesses:
L. VAUGHAN,
J. A. McINTYRE.

Copies of this patent may be obtained for five cents each, by addressing the "Commissioner of Patents, Washington, D. C."